United States Patent
Marx et al.

(10) Patent No.: US 6,725,067 B1
(45) Date of Patent: Apr. 20, 2004

(54) METHOD AND SYSTEM FOR RESTARTING A REFERENCE CLOCK OF A MOBILE STATION AFTER A SLEEP PERIOD WITH A ZERO MEAN TIME ERROR

(75) Inventors: Gerald Marx, San Diego, CA (US); Der-Chieh Koon, Encinitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/536,066

(22) Filed: Mar. 24, 2000

(51) Int. Cl.[7] .............................................. H04Q 7/20
(52) U.S. Cl. .................................. 455/574; 455/343.2
(58) Field of Search ............................. 455/574, 343.1, 455/343.2, 343.4, 343.5, 572, 67.11, 67.16, 423; 375/354, 356, 359, 362; 370/310, 311; 340/7.32, 7.38

(56) References Cited

U.S. PATENT DOCUMENTS

| | | | |
|---|---|---|---|
| 4,583,034 A | 4/1986 | Martin | |
| 5,182,746 A | 1/1993 | Hurlbut et al. | |
| 5,365,487 A | 11/1994 | Patel et al. | |
| 5,559,750 A | 9/1996 | Dosaka et al. | |
| 5,563,839 A | 10/1996 | Herdt et al. | |
| 5,583,813 A | 12/1996 | Dosaka et al. | |
| 5,598,375 A | 1/1997 | Yang et al. | |
| 5,613,235 A * | 3/1997 | Kivari et al. | 455/574 |
| 5,623,454 A | 4/1997 | Dosaka et al. | |
| 5,629,895 A | 5/1997 | Dosaka et al. | |
| 5,633,573 A | 5/1997 | van Phuoc et al. | |
| 5,650,968 A | 7/1997 | Dosaka et al. | |
| 5,652,723 A | 7/1997 | Dosaka et al. | |
| 5,713,028 A | 1/1998 | Takahashi et al. | |
| 5,737,323 A * | 4/1998 | Lansdowne | 370/311 |
| 5,751,925 A | 5/1998 | Kataoka et al. | |
| 5,773,966 A | 6/1998 | Steigerwald | |
| 5,790,941 A | 8/1998 | Peponides | |
| 6,088,602 A * | 7/2000 | Banister | 455/574 |
| 6,453,181 B1 * | 9/2002 | Challa et al. | 455/574 |
| 6,473,607 B1 * | 10/2002 | Shohara et al. | 455/343.1 |

* cited by examiner

Primary Examiner—Jean Gelin
(74) Attorney, Agent, or Firm—Blakely, Sokoloff, Taylor & Zafman LLP

(57) ABSTRACT

The present invention is a method and system to minimize the timing errors introduced by the use of a sleep clock, utilized in timing a sleep period, for a mobile station. Further, the present invention restarts a high frequency reference clock after the sleep period with a zero mean time error to ensure that the receiver of the mobile station is properly synchronized with a base station for the receipt of pages. A low frequency sleep clock is calibrated with respect to a high frequency reference clock during a pre-defined calibration period. Based upon the calibration, a calibration error for the sleep clock is determined. Next, a wake-up time error is calculated, based upon the calibration error, to compensate for the error of the sleep clock. The wake-up time error compensates for the error of the sleep clock during the sleep period such that the reference clock restarts at the end of the sleep period with a zero mean time error. This ensures that the reference clock and the receiver of the mobile station will be properly time synchronized with the base station for the receipt of pages.

16 Claims, 11 Drawing Sheets

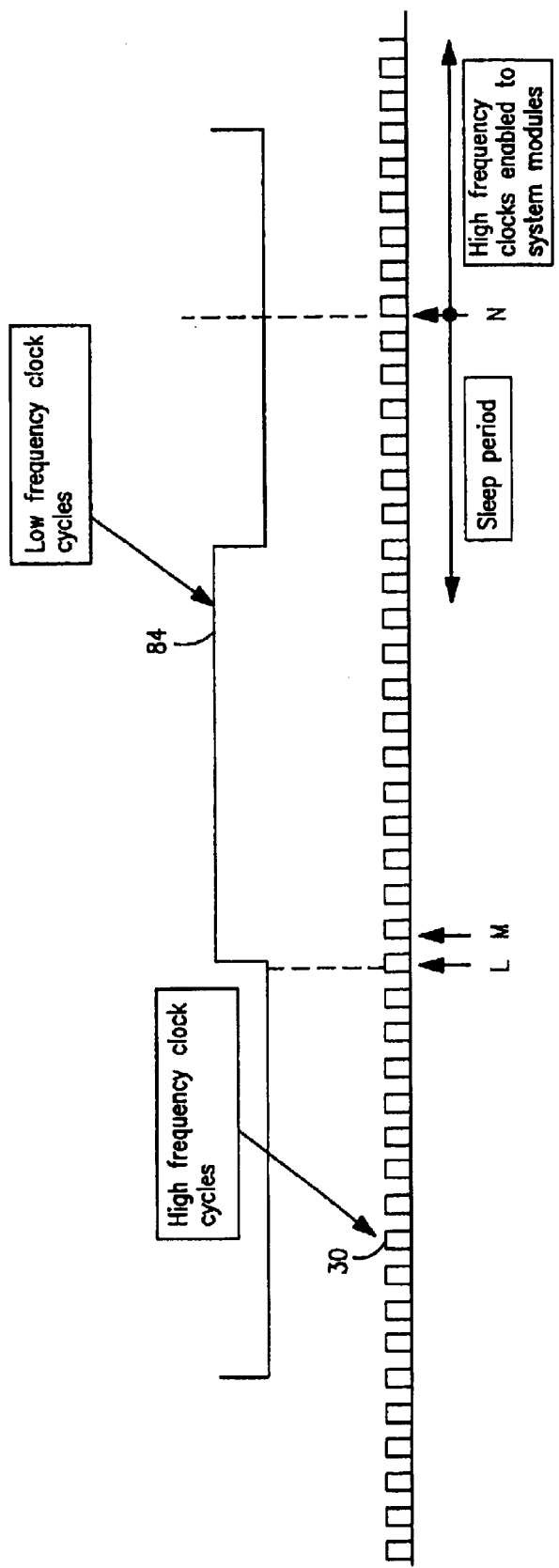

METHOD AND SYSTEM FOR RESTARTING A REFERENCE CLOCK OF A MOBILE STATION AFTER A SLEEP PERIOD WITH A ZERO MEAN TIME ERROR

BACKGROUND OF THE INVENTION

1. Field of the Invention

The present invention relates generally to communication systems. In particular, the invention relates to a method and system for restarting a reference clock of a mobile station after a sleep period with a zero mean time error.

2. Description of Related Art

A clock system that operates at a high frequency by utilizing a high frequency reference clock and which is adapted for use with a mobile station is known. One drawback of this type of clock system is that it uses a considerable amount of energy due to the fact that it continuously operates at a high frequency. Therefore, it is unsuitable for small and lightweight mobile stations, such as mobile cellular phones, which utilize a battery as a power source. In order to increase the life of the battery, so-called sleep clock systems have been developed.

When utilizing a sleep clock system, it is necessary for the mobile station to awaken its receiver to monitor a base station for message bursts at specified times, and to sleep during times when no messages are to be received. However, the amount of time that the receiver needs to be awake is small compared to the amount of time that the receiver can be asleep. During the sleep period, a low frequency low power sleep clock keeps track of time and the high frequency reference clock is deactivated and most system modules are off.

Message bursts are received at discrete intervals and last for an integer number of frames. The high frequency reference clock needs to be activated during these message bursts to synchronize the receiver with the incoming messages from the base station. More specifically, the receiver needs to be clocked at the high frequency reference clock frequency so that the receiver frames of the mobile station are synchronized with the incoming message frames from the base station.

One type of sleep clock system is disclosed in Finnish patent application No. 923976. This sleep clock system comprises two clock devices, the first of which operates at a high frequency and the second of which operates at a low frequency. The first clock device, the normal or reference clock, operates on the megahertz band and the second clock device, the sleep clock, on the kilohertz band. When the mobile station is in a rest condition, the first clock device is switched off and the second clock device with lower accuracy is employed instead. By this arrangement, the power consumption of the mobile station can be significantly decreased and the life of the battery correspondingly increased.

The sleep clock system described above is used in mobile stations of the GSM (Global System for Mobile Communications) system based on time division multiple access (TDMA). When the normal clock device of the mobile station's sleep clock system is switched off, the receiver of the mobile station is arranged to receive incoming messages from the base station only in certain pre-defined time stamps termed pages. A page is a pre-defined time period in which the mobile station is prepared to recognize an eventual incoming message. The sleep period of the mobile station between two pages is relatively long, in the range of 1 to 2 seconds. This sleep period between pages needs to be accurately measurable. Unfortunately, the use of a low accuracy sleep clock for measuring this sleep period introduces timing errors.

Accordingly, there is a need for a method and system that minimizes the timing errors introduced by the use of a sleep clock in timing a sleep period for a mobile station and that restarts a high frequency reference clock after the sleep period with a zero mean wake-up time error to help ensure that the receiver of the mobile station is properly synchronized in time with a base station for the receipt of pages.

SUMMARY OF THE INVENTION

The present invention provides a method and system to minimize the timing errors introduced by the use of a sleep clock in timing a sleep period for a mobile station. Further, the present invention provides a method and system to restart a high frequency reference clock after the sleep period with a zero mean time error to ensure that the receiver of the mobile station is properly synchronized with a base station for the receipt of pages.

A low frequency low power sleep clock is calibrated with respect to a high frequency reference clock during a specified calibration period. The actual frequency of the high frequency reference clock during calibration is assumed to be known by the mobile station. The frequency is tied to the reference clock frequency of the base station. Based upon the calibration, a calibration error for the sleep clock is determined. In a preferred embodiment, the calibration error is determined by counting the actual number of reference clock cycles that occur during the calibration period and by subtracting the expected number of reference clock cycles for the calibration period from the actual number counted. The expected number of reference clock cycles that should be counted during the calibration period is a real number.

Next, a wake-up time error is calculated, based upon the calibration error, to compensate for the error of the sleep clock during the sleep period. In a preferred embodiment, the wake-up time error is calculated by multiplying the calibration error by the ratio of the sleep period to the calibration period. The wake-up time error is utilized to compensate for the error of the sleep clock such that the reference clock restarts at the end of the sleep period with a zero mean time error.

Advantageously, at the end of the sleep period, the reference clock of the mobile station will be restarted with a zero mean time error to provide reference clock cycles to system modules and will properly time synchronize the receiver of the mobile station with the base station for the receipt of pages. Further, because a low frequency low power sleep clock is utilized during the majority of the time between pages, the power consumption of the mobile station is decreased and the life of the battery utilized with the mobile station is correspondingly increased.

Other features and advantages of the present invention will be set forth in part in the description which follows and the accompanying drawings, wherein the preferred embodiments of the present invention are described and shown, and in part will become apparent to those skilled in art upon examination of the following detailed description taken in conjunction with the accompanying drawings, or may be learned by the practice of the present invention. The advantages of the present invention may be realized and attained by means of the instrumentalities and combinations particularly pointed out in the appended claims.

BRIEF DESCRIPTION OF THE DRAWINGS

Referring now to the drawings in which like reference numbers represent corresponding parts throughout:

FIG. 4b is an expanded view of the beginning of the calibration period of FIG. 4a.

FIG. 4c is an expanded view of the end of the calibration period of FIG. 4a.

FIG. 6b is an expanded view of the beginning of the sleep period of FIG. 6a.

FIG. 6c is an expanded view of the end of the sleep period of FIG. 6a.

DETAILED DESCRIPTION OF THE PREFERRED EMBODIMENTS

Figure 1:
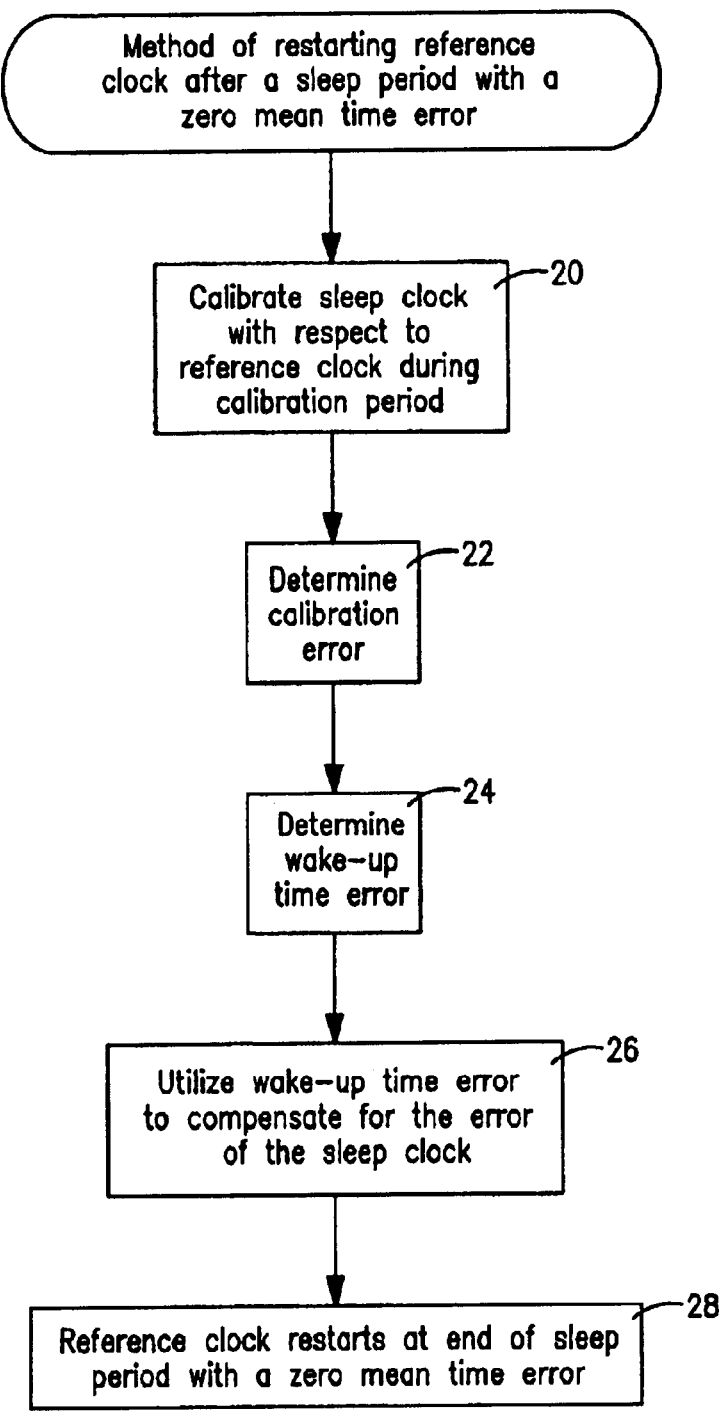
FIG. 1 is a flow diagram that illustrates a method for restarting a reference clock after a sleep period with a zero mean time error in accordance with a preferred embodiment of the present invention.

In the following description various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures and circuits, are shown in block diagram form in order not to obscure the present invention.

It is necessary for low power mobile stations to monitor a base station for message bursts, termed pages, at specified times. When utilizing a sleep clock system with the mobile station, it is necessary for the mobile station to awaken its receiver at specified times to monitor the base station for pages, and to sleep during times when no pages are to be received. Typically, when the receiver is awake, the mobile station is utilizing a high frequency reference clock to synchronize the receiver with incoming pages from the base station, and when the receiver is asleep, a low power low frequency sleep clock is used. Also, the high frequency reference clock frequency is periodically adjusted by reading the frequency channel from the base station so that the mobile station and the base station are synchronized in frequency. In the use of mobile stations, the amount of time that the receiver needs to be awake, and the high frequency reference clock activated, is generally small compared to the time that the receiver can be asleep. During the sleep period, the sleep clock keeps track of time and the reference clock is deactivated and most system modules are off.

Pages are received from the base station at discrete intervals and last for an integer number of frames. After a sleep period, the high frequency reference clock needs to be reactivated to synchronize the receiver of the mobile station with the incoming pages from the base station. The receiver needs to be clocked at the reference clock frequency so that the receiver frames of the mobile station are synchronized in frequency with the incoming page frames from the base station. Unfortunately, low frequency sleep clocks are driven by crystal based oscillators which introduce timing errors making the accurate timing of the sleep period, the accurate timing of the reactivation the reference clock, and the subsequent synchronization of the receiver to the base station very difficult, often resulting in the failure of the synchronization process.

Generally, the present invention provides a method and system to compensate for the errors introduced by the use of the sleep clock in timing the sleep period for the mobile station. Further, the present invention provides a method and system to restart the high frequency reference clock after the sleep period with a zero mean time error to ensure that the receiver of the mobile station is properly synchronized with the base station for the receipt of pages.

DEFINITIONS AND ACRONYMS

T_LF—Nominal time period of the low frequency sleep clock.

T_HF—Time period of the high frequency reference clock.

T_CAL—Time duration of the calibration interval.

T_FR—Time duration of a frame.

T_SLP—Time duration of the sleep interval.

NUM_HF_FR—Number of high frequency reference clock cycles per frame.

NUM_FR_DURING_CAL—The number of frames during calibration.

NUM_HF_CAL1—Number of high frequency reference clock cycles that are counted after the calibration interval starts but before the first rising edge of the low frequency sleep clock.

NUM_HF_CAL2—Number of high frequency reference clock cycles that are counted after the trailing rising edge of the last low frequency sleep clock cycle during the calibration interval.

NUM_HF_DURING CAL—Total counted number of high frequency reference clock cycles during calibration.

NUM_LF_DURING_CAL—Specified number of low frequency sleep clock cycles during calibration.

EXP_NUM_HF_DURING_CAL—Expected number of counted high frequency reference clock cycles during calibration. Consists of integer and fractional component.

NUM_HF_CORR—Adjustment to the nominal number of high frequency reference clock cycles during the sleep interval. The nominal number is the number that is specified when using a perfect low frequency sleep clock.

NUM_HF_SLEEP—Number of total specified high frequency reference clock cycles during the sleep interval.

NUM_LF_OSC_OFF—Number of total specified low frequency sleep clock cycles during the sleep interval during which the high frequency oscillator for the high frequency reference clock is off.

NUM_LF_WU—Number of specified low frequency sleep clock cycles during the sleep interval during which the high frequency oscillator for the high frequency reference clock is warming up.

NUM_LF_TOT—Total number of low frequency sleep clock cycles during the sleep interval.

FIG. 1 is a flow diagram that generally illustrates a method for restarting a reference clock after a sleep period with a zero mean time error in accordance with a preferred embodiment of the present invention. In block 20, a sleep clock is calibrated with respect to a reference clock during a specified calibration period. Based upon the calibration, a calibration error for the sleep clock is determined in block 22. Next, a wake-up time error is calculated, block 24, based upon the calibration error, to compensate for the error of the sleep clock during the sleep period. As illustrated in block 26, the wake-up time error is utilized to compensate for the error of the sleep clock. Block 28 shows that the reference clock can then restart, at the end of the sleep period, with a zero mean time error such that the receiver of the mobile station is properly synchronized with the base station for the receipt of pages.

Figure 2:
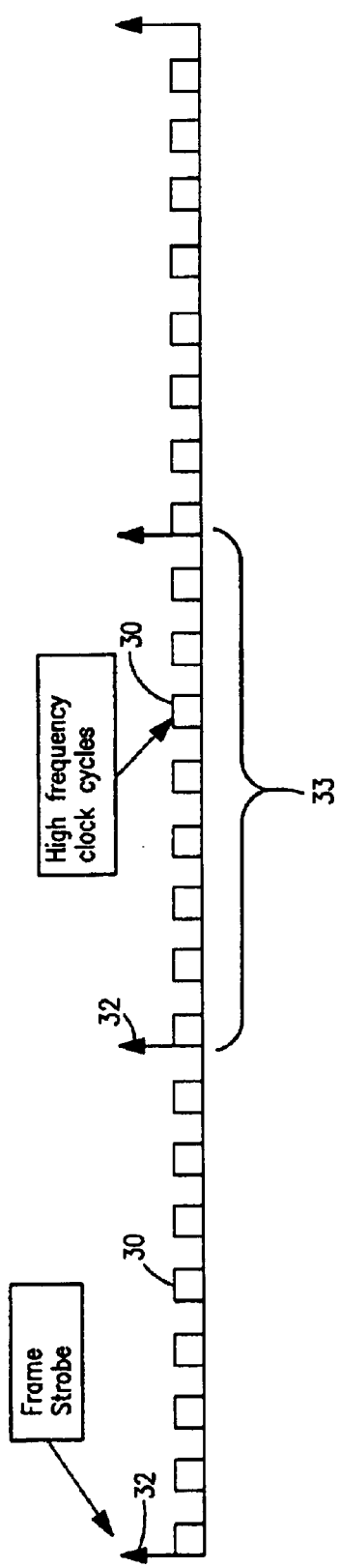
FIG. 2 is a timing diagram illustrating the frame structure for a high frequency reference clock.

FIG. 2 is a timing diagram illustrating the frame structure for a high frequency reference clock. The high frequency reference clock cycles 30 are used to generate frame strobes 32. In this embodiment, there are eight high frequency reference clock cycles 30 per frame 33. The frame strobes 32 occur on the rising edge of a reference clock cycle. System operation is keyed off of the frame strobe 32. A message burst, or page, is received during an integer number of frames.

Figure 3:
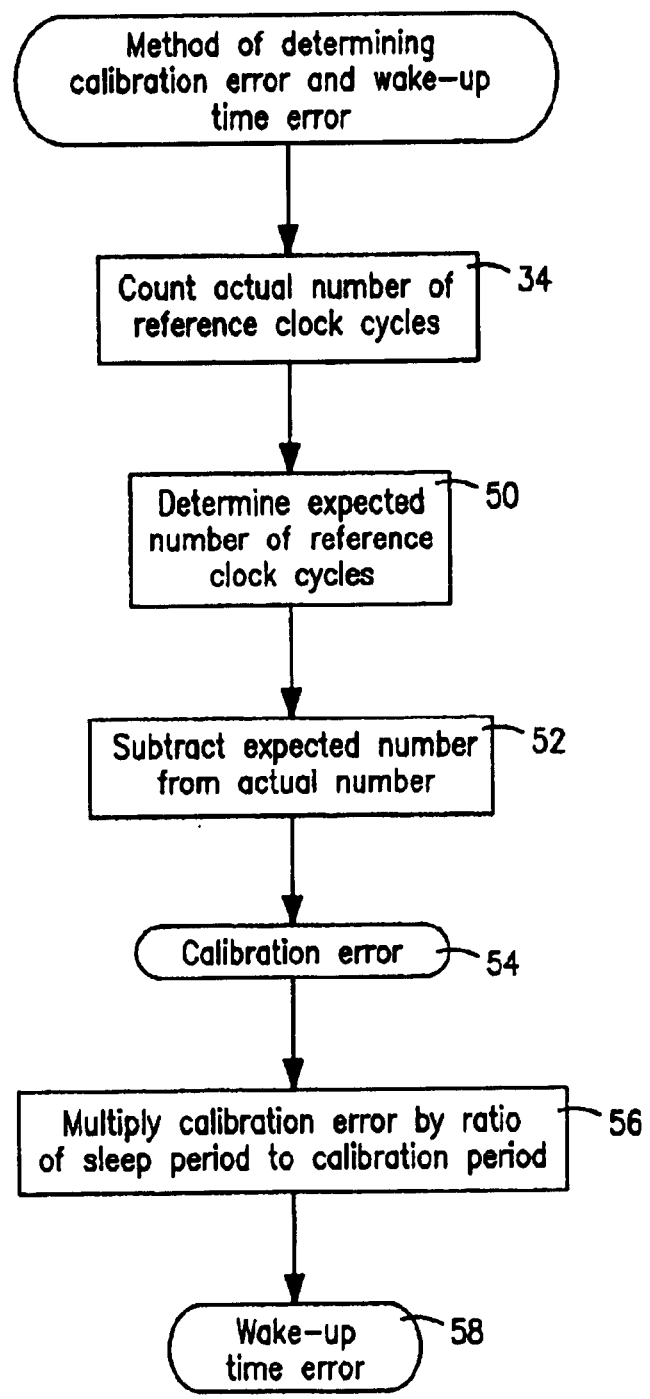
FIG. 3 is a flow diagram that illustrates in detail the method of determining the calibration error and the wake-up time error of FIG. 1 for the calibration of a low frequency sleep clock according to a preferred embodiment of the present invention.

FIG. 3 is a flow diagram that illustrates in detail a method of determining a calibration error and wake-up time error according to a preferred embodiment of the present invention. The first step of determining the calibration error, as shown in block 34, is to count the actual number of high frequency reference clock cycles occurring during a calibration period. This process will be illustrated with reference to timing diagrams 4a–4c.

Figure 4A:
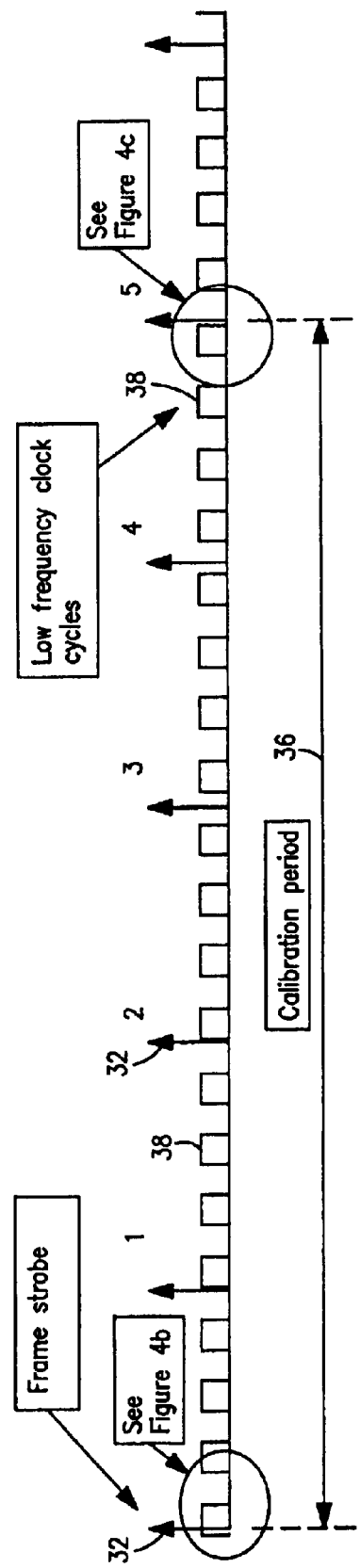
FIG. 4a is a timing diagram illustrating the calibration of the low frequency sleep clock of FIG. 3 according to a preferred embodiment of the present invention.

FIG. 4a is a timing diagram illustrating the calibration of a low frequency sleep clock with respect to a high frequency reference clock according to a preferred embodiment of the present invention. FIG. 4a shows an example of a specified calibration period. In this example, a calibration period 36 of five frames is illustrated. The low frequency sleep clock cycles 38 are asynchronous to the high frequency reference clock cycles and are therefore asynchronous to the frame strobes 32. The reference clock is always on during the calibration period 36.

Figure 4B:
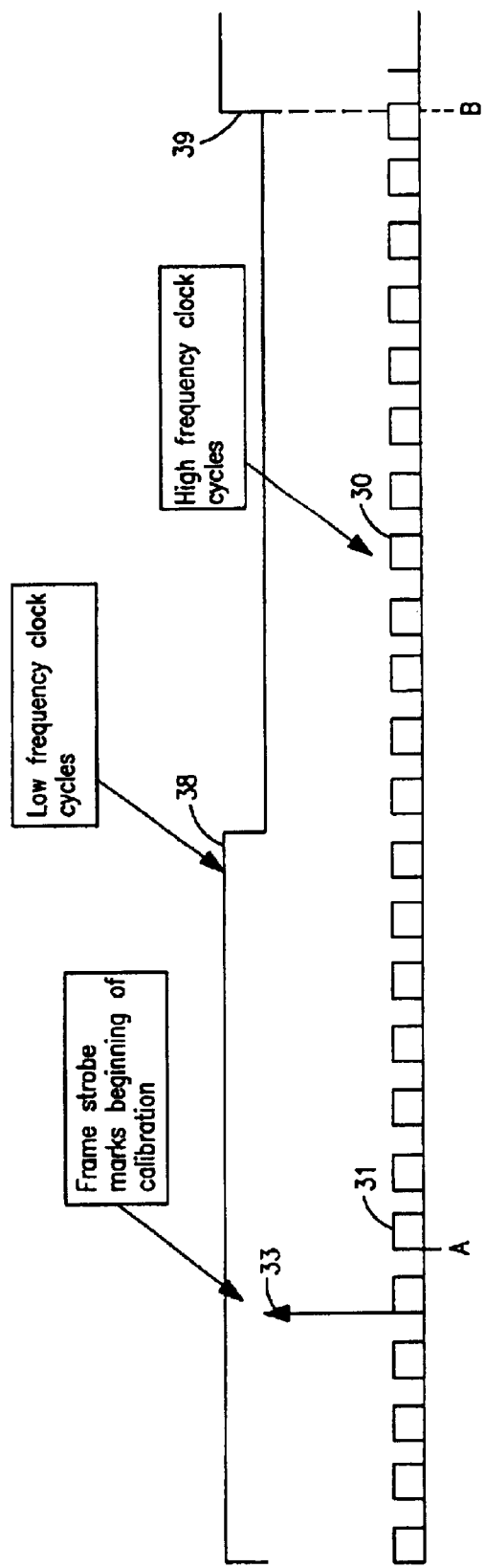

FIG. 4b is an expanded view of the beginning of the calibration period of FIG. 4a. During the calibration process, high frequency reference clock cycles 30 are counted on the rising edge until the first rising edge of the low frequency sleep clock cycle 39 occurs. Frame strobe 33 marks the beginning of the specified calibration period. At label "A", the first high frequency reference clock cycle 31 is counted. This counting continues until the first rising edge of a low frequency sleep clock cycle 39 at label "B" occurs. The counted number of high frequency reference clock cycles 30 in the interval of the specified calibration period that is shown in FIG. 4b is denoted as NUM_HF_CAL1. In this example, nine-teen (19) high frequency reference clock cycles 30 are counted until the first rising edge of the sleep clock cycle at label "B". Also, notice that about $3/8$ of a reference clock cycle is not counted at label "B" in FIG. 4b, which will be discussed later.

Starting at label "B", a specified predetermined number of low frequency sleep clock cycles, denoted NUM_LF_CAL, are counted down. NUM_LF_CAL is calculated as follows: NUM_LF_CAL=INTEGER (T_CAL/T_LF)−2 where the INTEGER function takes the integer portion of the fractional number. T_CAL is the time duration of the specified calibration period and T_LF is the low frequency sleep clock period. T_CAL is calculated as: T_CAL=T_FR*NUM_FR_DURING_CAL where T_FR is the time duration of a frame and NUM_FR_DURING_CAL is the number of frames specified for the calibration period. Additionally, T_FR is calculated as: T_FR=NUM_HF_FR*T_HF where NUM_HF$_{13}$FR is the number of high frequency reference clock cycles per frame and T_HF is the period of the high frequency reference clock. In the computation of NUM_LF_CAL, a value of 2 is subtracted instead of a value of 1. This prevents the possibility of a hardware system utilized to perform these calculations not counting down NUM_LF_CAL low frequency clock cycles to zero if the period of the low frequency clock is much larger than nominal.

Figure 4C:
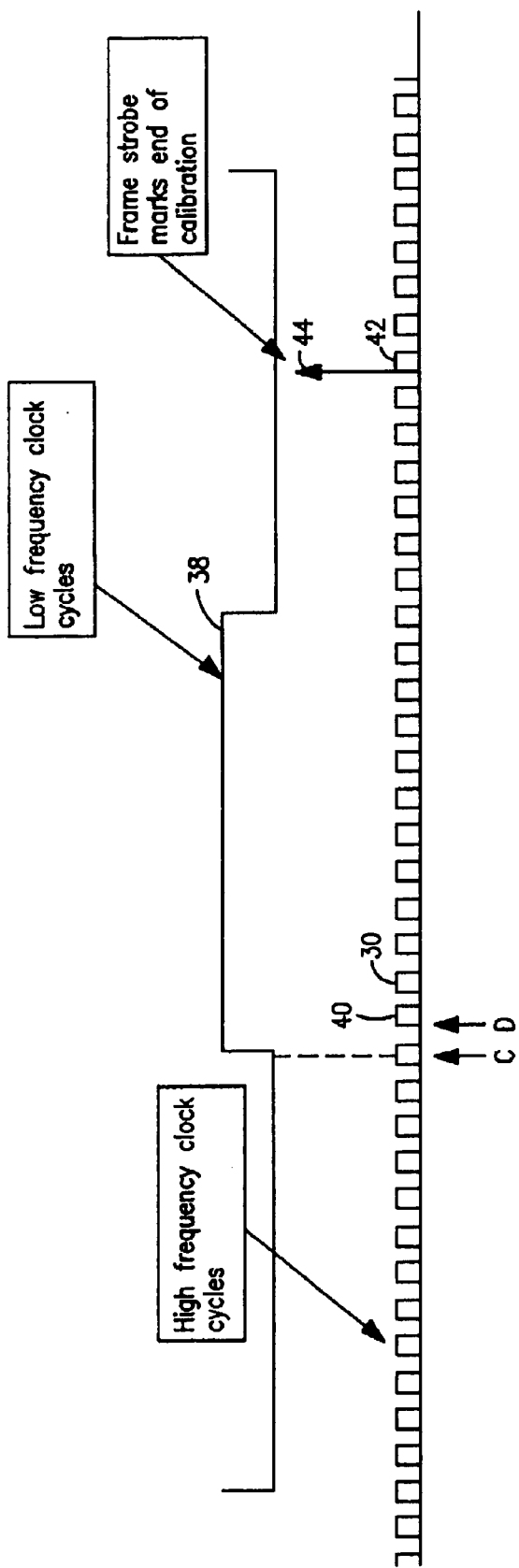

FIG. 4c is an expanded view of the end of the specified calibration period of FIG. 4a. At label "C", the specified predetermined number of low frequency sleep clock cycles 38, denoted NUM_LF_CAL, have been counted down. This occurs on the trailing rising edge of the last NUM_LF_CAL low frequency sleep clock cycle at label "C". At label "D", the first high frequency reference clock cycle 40 is counted. The high frequency reference clock cycles 30 are counted from the rising edge of the first reference clock cycle 40, shown at label "D", which occurs immediately after the last NUM_LF_CAL sleep clock cycle at label "C".

Counting continues until the rising edge of the last high frequency reference clock cycle 42 aligned with the last frame strobe 44 of the specified calibration period. This marks the end of the calibration period and the counting of high frequency reference clock cycles 30 stops. The counted number of high frequency reference clock cycles in the interval of the calibration period that is shown in FIG. 4c is denoted by NUM_HF_CAL2. In this example, nine-teen (19) high frequency reference clock cycles 30 are counted until the last frame strobe 44 of the calibration period.

The total actual number of counted high frequency reference clock cycles 30 during the entire specified calibration period is denoted as NUM_HF_DURING_CAL. NUM_HF_DURING_CAL is calculated as: NUM_HF_DURING_CAL=NUM_HF_CAL1+NUM_HF_CAL2. In this example, a total of thirty-eight (38) high frequency reference clock cycles are counted during the specified calibration period since nineteen (19) high frequency reference clock cycles were counted in FIG. 4b.

Additionally, FIG. 4c shows that the rising edge of the high frequency reference clock cycle at label "D" causes one reference clock cycle to be counted even though approximately $3/4$ of the cycle occurs after the rising edge of the low frequency sleep clock cycle at label "C". Therefore, the negative high frequency reference clock cycle bias that is illustrated in FIG. 4b and the positive high frequency reference clock cycle bias that is illustrated in FIG. 4c cancel each other out.

Also, it should be appreciated, that there are two possible error values in calibrating the low frequency sleep clock with the high frequency reference clock. This assumes that the frequency of the low frequency clock varies minimally during calibration. This is a very reasonable assumption. The error in high frequency reference clock cycles falls in the range of +/− one high frequency reference clock cycle and the difference between these two error values is one high frequency reference clock cycle. For example, −0.25 and +0.75 high frequency reference clock cycles. The actual error values depend on the number of fixed period frames that are used for calibration. The probabilities of each of the two errors results in a zero mean calibration error.

Returning again to FIG. 3, to determine the calibration error for a sleep clock, first the actual number of high frequency reference clock cycles are counted, as in block 34. This number is calculated during the calibration period, as previously discussed, and is denoted as NUM_HF_DURING_CAL. Further, in block 50, the expected number of high frequency reference clock cycles is also calculated. The expected number of high frequency reference clock cycles calculated in block 50 is denoted as EXP_NUM_HF_DURING_CAL. This is the number that would occur if the low frequency sleep clock were perfect, i.e. had no frequency error associated with it. EXP_NUM_HF_DURING_CAL is a real number. EXP_NUM_HF_DURING_CAL is computed as: EXP_NUM_HF_DURING_CAL=($T_{13}$ CAL−NUM_LF_CAL*T_LF)/T_HF where T_CAL is the time duration of the calibration interval, NUM_LF_CAL is the specified predetermined number of low frequency sleep clock cycles, T_LF is the sleep clock period, and T_HF is the period of the high frequency reference clock. It should be appreciated that keeping the fractional portion in the computation of EXP_NUM_HF_DURING_CAL is key in achieving a zero mean wake-up time error.

As shown in block 52, the calibration error is then determined by subtracting the expected number of high frequency reference clock cycles, EXP_NUM_HF_DURING_CAL, from the actual number of high frequency reference clock cycles counted, NUM_HF_DURING_CAL. Thus the calibration error is determined in block 54 as: calibration error=(NUM_HF_DURING_CAL−EXP_NUM_HF_DURING_CAL).

By determining the calibration error, as previously described, the present invention provides a method to compensate for the timing errors introduced by the use of a sleep clock in timing a sleep period, to be discussed in greater detail below, by determining a wake-up time error for the high frequency reference clock. As in block 56, the wake-up time error is calculated by multiplying the calibration error by the ratio of the sleep period to the calibration period. The wake-up time error is denoted as NUM_HF_CORR. Thus the wake-up time error is determined in block 58 as: NUM_HF_CORR=INTEGER [(NUM_FR_DURING_SLP/NUM_FR_DURING_CAL)*(NUM_HF_DURING_CAL−EXP_NUM_HF_DURING_CAL)] where NUM_FR_DURING_CAL is the number of frames used for the calibration period and NUM_FR_DURING_SLP is the number of frames specified for the sleep period. Once the low frequency sleep clock is calibrated and the wake-up time error computed, it is possible to use the low frequency sleep clock to track time while the high frequency reference clock is deactivated for an integer number of frames, and have the high frequency reference clock wake up with a zero mean time error.

Typically, the base station instructs the mobile station to go into sleep mode between pages for a specified sleep period, i.e. a specified amount of sleep time, denoted as T_SLP. This sleep period is for a desired number of sleep frames designated as NUM_FR_DURING_SLP. During this sleep period, high frequency reference clock cycles are disabled to system modules for a majority of the sleep period over an integer number of frames.

During the sleep period, T_SLP, a specified total number of high frequency reference clock cycles are counted and a specified total number of low frequency sleep clock cycles are counted. The period that is covered by these cycles should equal the period that is covered by the desired number of sleep frames, i.e., NUM_FR_DURING_SLP. The total number of specified high frequency reference clock cycles is denoted by NUM_HF_SLEEP and the total number of specified low frequency sleep clock cycles is denoted by NUM_LF_TOT.

During the sleep period, a high frequency oscillator for the high frequency reference clock is off for NUM_LF_OSC_OFF low frequency sleep clock cycles. This period starts with the first rising edge of the low frequency sleep clock during the sleep period. The oscillator is then warmed up during NUM_LF_WU low frequency sleep clock cycles. Thus, NUM_LF_TOT=NUM_LF_WU+NUM_LF_OSC_OFF. NUM_LF_TOT is set to INTEGER (T_SLP/T_LF)−1. T_SLP=NUM_FR_DURING_SLP*T_FR where NUM_FR_DURING_SLP is the number of frames during the sleep period, and T_FR is the period of the frame. T_LF is the nominal time period of the low frequency sleep clock. During the warm-up period, the high frequency oscillator is not used to generate any high frequency reference clock cycles that are supplied to system modules.

The total number of specified high frequency reference clock cycles, NUM_HF_SLEEP, during the sleep interval is computed as: NUM_HF_SLEEP=nominal number of reference clock cycles+wake-up time error=INTEGER [(T_SLP−NUM_LF_TOT*T_LF)/T_HF]+NUM_HF_CORR. The nominal number of reference clock cycles is computed as INTEGER [(T_SLP−NUM_LF_TOT*T_LF)/T_HF] and NUM_HF_CORR is the wake-up time error previously computed. T_HF is the time period for the high frequency reference clock. The nominal number is the number of reference clock cycles that could be specified if the sleep clock were perfect.

The wake-up time error, NUM_HF_CORR, is the correction to the nominal number of high frequency reference clock cycles during the sleep interval based upon the previous calibration of the sleep clock. The wake-up time error compensates for the timing errors of the sleep clock. The wake-up time error is positive if the period of the sleep clock is smaller than ideal and negative if the period is larger than ideal. As will be discussed in greater detail below, by counting down the specified total number of high frequency reference clock cycles, NUM_HF_SLEEP, the timing errors of the sleep clock are compensated for, and at the end of the sleep period, the high frequency reference clock of the mobile station will be restarted with a zero mean time error to help ensure that the receiver of the mobile station is properly synchronized with the base station for the receipt of pages.

Figure 5:
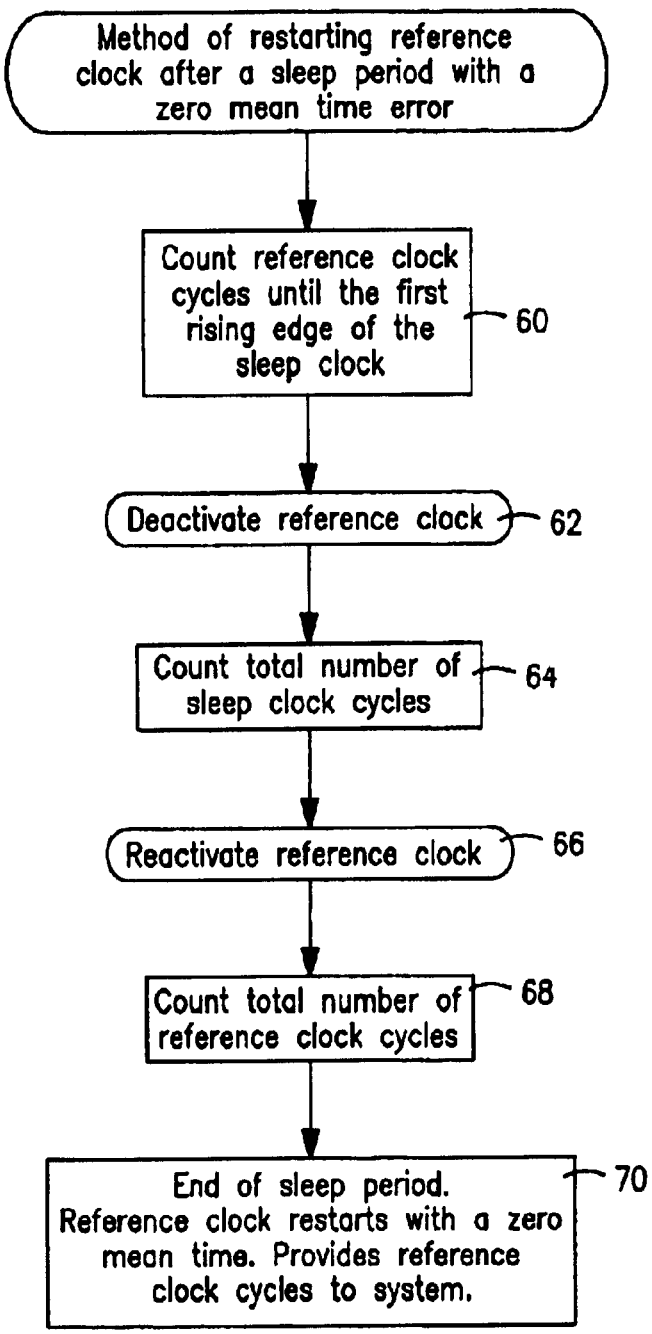
FIG. 5 is a flow diagram that illustrates in detail the method of restarting the reference clock after the sleep period with a zero mean time error of FIG. 1 according to a preferred embodiment of the present invention.

FIG. 5 is a flow diagram that illustrates in detail the method of restarting the reference clock after the sleep period with a zero mean time error according to a preferred embodiment of the present invention. In block 60, after the sleep period begins, the total number of specified high frequency reference clock cycles, NUM_HF_SLEEP, are counted down until the first rising edge of the sleep clock occurs. The high frequency reference oscillator and hence the high frequency reference clock, in block 62, is then deactivated. As shown in block 64, the specified total number of low frequency sleep clock cycles, NUM_LF_TOT, are then counted. Afterwards, the reference clock, in block 66, is then reactivated. The total number of specified high frequency reference clock cycles, NUM_HF_SLEEP, are then counted, block 68. This marks the end of the sleep period, block 70, and the reference clock is restarted with a zero mean time error. High frequency reference clock cycles are the supplied to system modules.

Figure 6A:
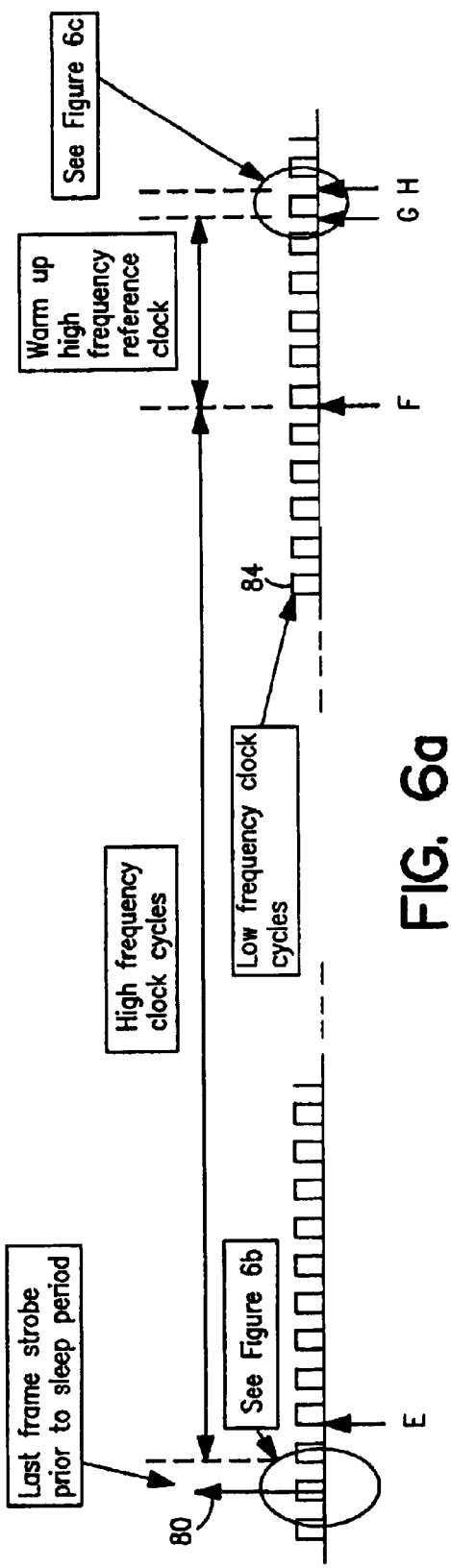
FIG. 6a is a timing diagram illustrating in detail the sleep period of FIG. 5 according to a preferred embodiment of the present invention.

FIG. 6a a timing diagram illustrating in detail the sleep period of FIG. 5 according to a preferred embodiment of the present invention. After the frame strobe 80, which marks the beginning of sleep period, the specified total number of high frequency reference clock cycles, NUM_HF_SLEEP, are counted down until the first rising edge of the first low frequency sleep clock cycle. Then, the high frequency reference oscillator that is used to generate high frequency reference clock cycles is turned off and the specified total number of low frequency sleep clock cycles 84 are counted. The rising edge at label "E" marks the end of the first low frequency sleep clock cycle.

At label "F", the specified total number of low frequency sleep clock cycles 84, NUM_LF_OSC_OFF, have been counted. Label "F" marks the beginning of the warm-up period of the high frequency oscillator for the high frequency reference clock. This period lasts for another specified number of sleep clock cycles, NUM_LF_WU. It ends at the rising edge of the sleep clock cycle at label "G", and a resumption of the counting down of the specified total number of high frequency reference clock cycles, NUM_HF_SLEEP, occurs. The sleep period is completed when the specified total number of high frequency reference clock cycles have been counted down to zero. This occurs at label "H". High frequency reference clock cycles are enabled to the system modules after label "H". During the period from "F" to "H", high frequency reference clock cycles are not provided to system hardware modules.

Figure 6B:
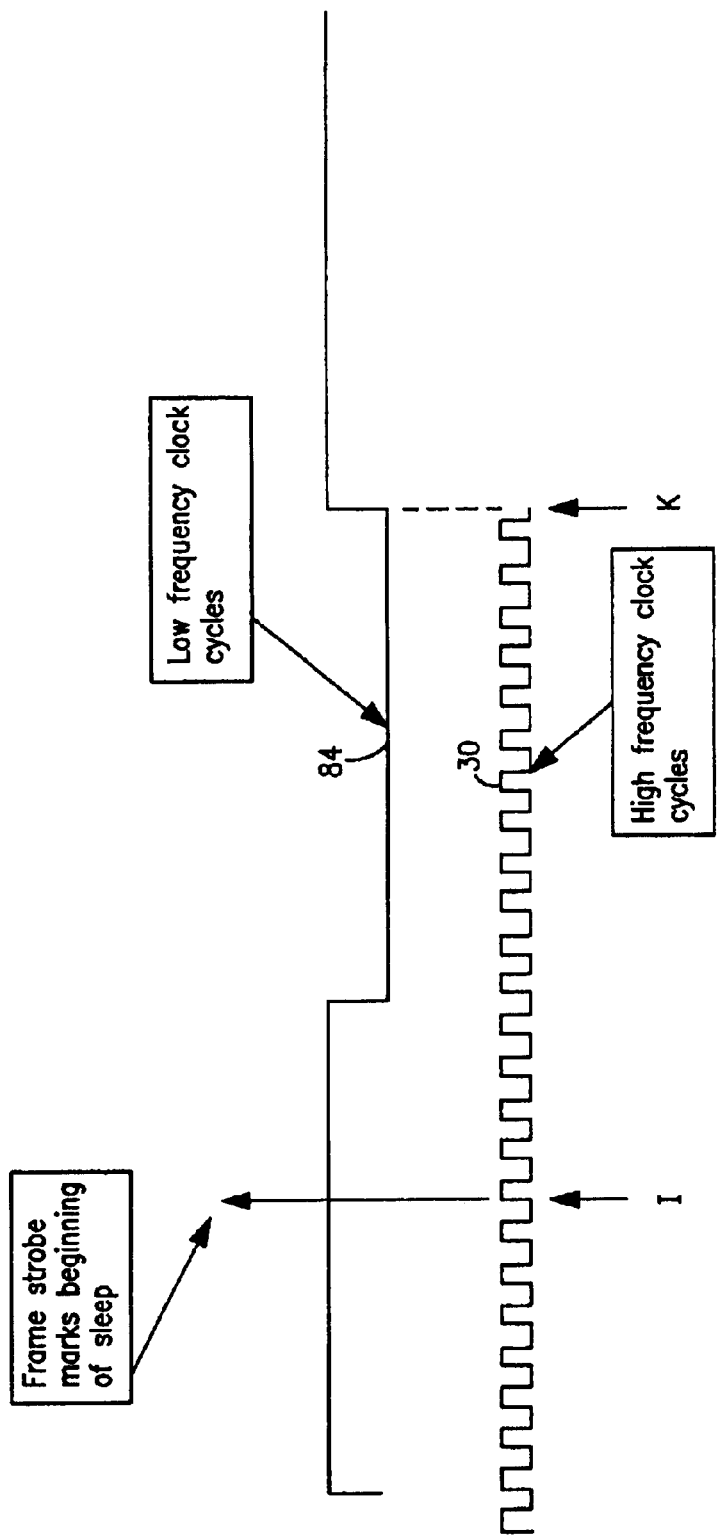

FIG. 6b is an expanded view of the beginning of the sleep period of FIG. 6a. High frequency reference clock cycles 30 are counted from the beginning of the sleep period, which is marked by a frame strobe at label "I" up to the first rising edge of the low frequency sleep clock cycle 84 at label "K". After this point, high frequency reference clock cycles 30 are not supplied to system modules. High frequency reference clock cycles 30 are then counted down from the specified value, NUM_HF_SLEEP. At label "K", the first rising edge of a low frequency sleep clock occurs. Here, the high frequency reference clock is turned off and the counting down of the specified total number of low frequency sleep clock cycles, NUM_LF_OSC_OFF, begins. In the illustrated example, sixteen (16) high frequency reference clock cycles 30 have been counted down until the first rising edge of the low frequency sleep clock at label "K". The first low frequency sleep clock cycle is counted down on the next rising edge of the low frequency sleep clock.

FIG. 6c is an expanded view of the end of the sleep period of FIG. 6a. High frequency reference clock cycles 30 are counted after the trailing rising edge of the NUM_LF_TOTth low frequency sleep clock cycle at label "L" which marks the end of the warm-up period. At this point, the counting down of the specified total number of high frequency reference clock cycles, NUM_HF_SLEEP, continues with the rising edge of the high frequency reference clock cycle at label "M". At label "N", the specified total number of high frequency reference clock cycles, NUM_HF_SLEEP, has occurred. High frequency reference clock cycles are now enabled to system modules since the sleep period is completed.

Advantageously, at the end of the sleep period, the high frequency reference clock of the mobile station will be restarted with a zero mean time error to provide high frequency reference clock cycles to system modules and will properly time synchronize the receiver of the mobile station with the base station for the receipt of pages. Also, because a low frequency low power sleep clock is utilized during the majority of the time between pages, the power consumption of the mobile station is decreased and the life of the battery utilized with the mobile station is correspondingly increased.

Implementation

Figure 7:
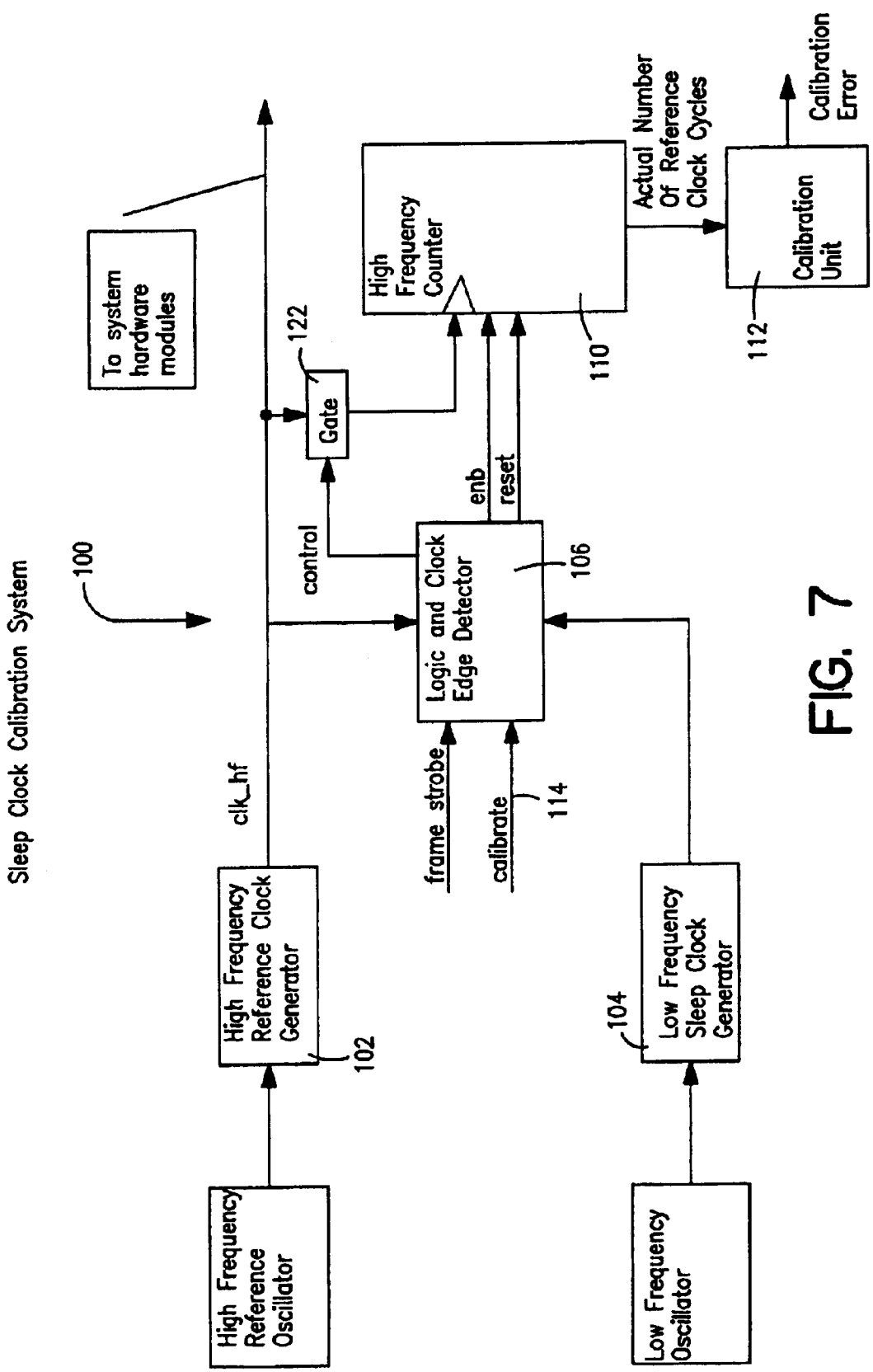
FIG. 7 is a block diagram illustrating a system for calibrating the sleep clock according to a preferred embodiment of the present invention.
Figure 8:
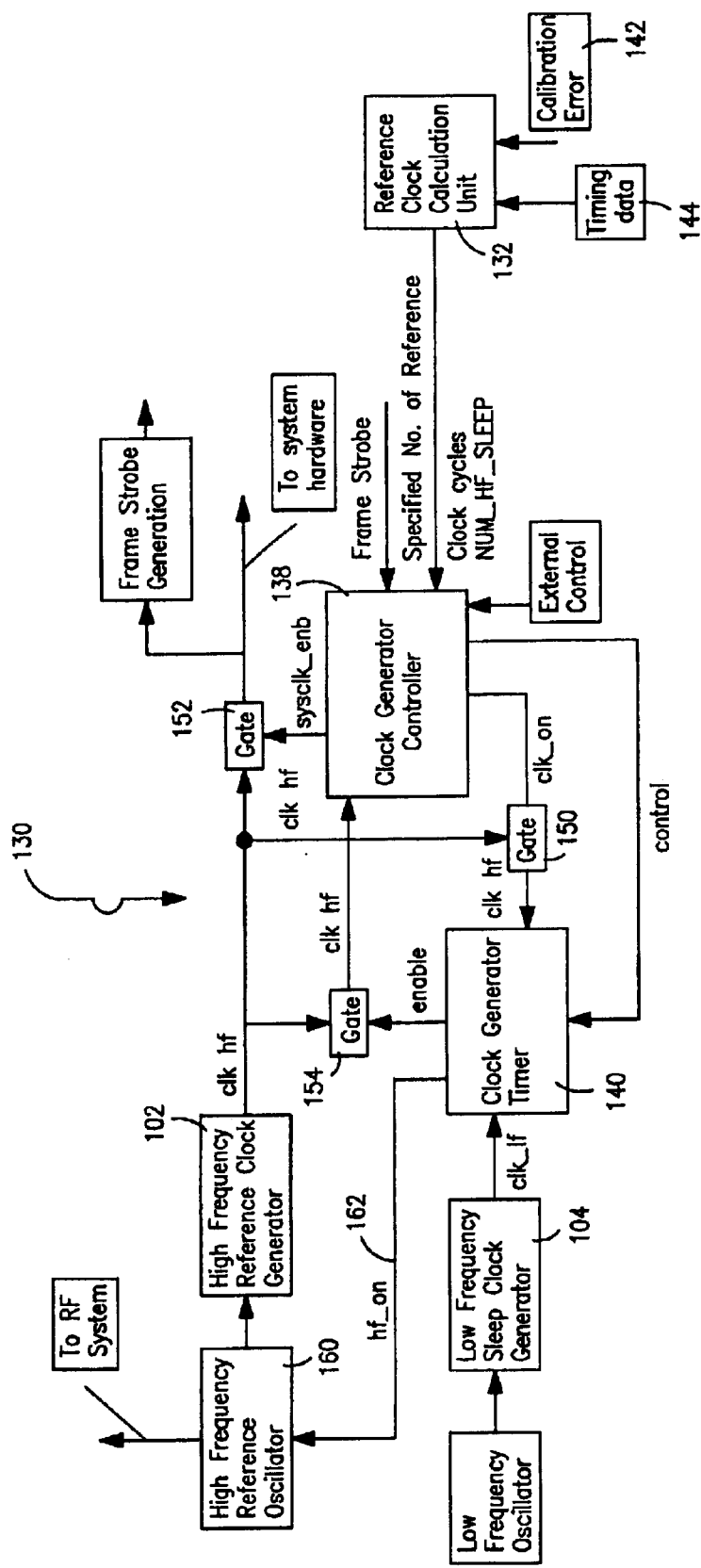
FIG. 8 is a block diagram illustrating a system for timing the sleep period and restarting the reference clock with a zero mean time error according to a preferred embodiment of the present invention.

The methods for calibrating the low frequency sleep clock and restarting the high frequency reference clock after the sleep period with a zero mean time error described above are intended for implementation in low power mobile stations. Many of the functions described above may be implemented as hardware modules in one or more Application Specific Integrated Circuits (ASICs). Hardware modules may be programmed by writing values to their registers. Also, many of the functions, such as algorithmic computations, may be performed in software for flexibility, or in hardware. FIGS. 7 and 8 below provide exemplary hardware implementations for the present invention.

FIG. 7 is a block diagram illustrating a system for calibrating the low frequency sleep clock with the high frequency reference clock according to a preferred embodiment of the present invention. The sleep clock calibration system 100 includes a high frequency reference clock 102, a low frequency sleep clock 104, a logic and clock edge detector 106, a high frequency counter 110, and a calibration unit 112. The calibration process is initiated when the logic detector 106 receives a calibrate signal 114. The calibrate signal 114 commands the logic detector 106 that the calibration period will begin on the next frame strobe. After the frame strobe, the logic detector 106 gates high frequency reference clock cycles from the high frequency reference clock 102, via gate 122, to the high frequency counter 110 where the number of reference clock cycles received are counted.

After the first rising edge of the low frequency sleep clock cycle (see FIG. 4b) from the low frequency sleep clock 104 is detected by the logic detector 106, gate 122 is disabled by the logic detector 106, and high frequency reference clock cycles are no longer gated to the high frequency counter 110. The logic detector 106 then counts the specified total number of low frequency sleep clock cycles. After the logic detector 106 detects the trailing rising edge of the last low frequency sleep clock cycle (see FIG. 4c), the logic detector 106 again enables gate 122. High frequency reference clock cycles are gated to the high frequency counter 110, where the number of reference clock cycles received are counted. This continues until the logic detector 106 receives the frame strobe ending the calibration period and the logic detector 106 disables high frequency reference clock cycles to the high frequency counter 110. The actual number of high frequency reference cycles, denoted NUM_HF_DURING_CAL, counted by the high frequency counter 110 during the calibration period, is then transmitted to the calibration unit 112.

The calibration unit 112 calculates the calibration error. The calibration unit 112 performs the numerical calculations for determining the calibration error, implementing the method illustrated in FIG. 3, and previously described in specification. Briefly, the calibration unit 112 calculates the expected number of high frequency reference clock cycles denoted as EXP_NUM_HF_DURING_CAL which is the number of high frequency reference clock cycles that would occur if the low frequency sleep clock were perfect, i.e. had no timing error associated with it. EXP_NUM_HF_DURING_CAL is a real number. EXP_NUM_HF_DURING_CAL is computed as: EXP_NUM_HF_DURING_CAL=$(T_{CAL-NUM}$_LF_CAL*T_LF)/T_ where T_CAL is the time duration of the calibration interval, NUM_LF_CAL is the specified number of low frequency sleep clock cycles, T_LF is the nominal sleep clock period, and T_HF is the period of the high frequency reference clock.

The calculation unit 112 calculates the calibration error by subtracting the expected number of high frequency reference clock cycles, EXP_NUM_HF_DURING_CAL, from the actual number of high frequency reference clock cycles counted, NUM_HF_DURING_CAL. Thus, the calibration unit 112 determines the calibration error as: calibration error=(NUM_HF_DURING_CAL−EXP_NUM_HF_DURING_CAL).

FIG. 8 is a block diagram illustrating a system for timing the sleep period and restarting the reference clock with a zero mean time error according to a preferred embodiment of the present invention. The system for timing the sleep period 130 includes a reference clock calculation unit 132, the high frequency reference clock 102, the low frequency sleep clock 104, a clock generator controller 138, and a clock generator timer 140. The system for timing the sleep period 130, in a broad sense, implements the method illustrated in FIG. 5, and previously described in the specification, for timing the sleep period and restarting the reference clock with a zero mean time error.

The reference clock calculation unit 132 receives the calibration error 142 from the calibration unit 112 and timing data 144. The timing data 144 includes the following information: the specified time of the sleep period (T_SLP); the total number of specified low frequency sleep clock cycles (NUM_LF_TOT); the nominal time period for the low frequency sleep clock (T_LF); the time period for the high frequency reference clock (T_HF); the number of frames during the sleep period (NUM_FR_DURING_SLP); and the number of frames used for the calibration period (NUM_FR_DURING_CAL). Based upon the calibration error 142 and the timing data 144, the reference clock calculation unit 132 calculates the total number of specified high frequency reference clock cycles (NUM_HF_SLEEP) to be counted during the sleep period and transmits this data to the clock generator controller 138.

The reference clock calculation unit 132 performs the numerical calculations for determining the total number of specified high frequency reference clock cycles (NUM_HF_SLEEP) as previously described in specification. Briefly, the reference clock calculation unit 132 calculates NUM_HF_SLEEP for the sleep interval as follows: NUM_HF_SLEEP=nominal number of reference clock cycles+wake-up time error=INTEGER[(T_SLP−NUM_LF_TOT*T_LF)/T_HF]+NUM_HF_CORR. The nominal number of reference clock cycles is computed as INTEGER[(T_SLP−NUM_LF_TOT*T_LF)/T_HF]. The nominal number is the number of reference clock cycles that could be specified if the sleep clock were perfect. The reference clock calculation unit 132 calculates the wake-up time error by multiplying the calibration error by the ratio of the sleep period to the calibration period. Thus the wake-up time error is determined as: NUM_HF_CORR=INTEGER[(NUM_FR_DURING_SLP/NUM_FR_DURING_CAL)*(NUM_HF_DURING_CAL−EXP_NUM_HF_DURING_CAL)]. The wake-up time error compensates for the frequency error of the sleep clock. After the reference clock calculation unit 132 calculates the total number of specified high frequency reference clock cycles, NUM_HF_SLEEP, it transmits this value to the clock generator controller 138.

The clock generator controller 138 receives a frame strobe and external control information commanding the clock generator controller 138 to enable gate 150 and to disable gate 152. This results in high frequency reference clock cycles being gated from the high frequency reference clock 102 to the clock generator timer 140 and the disabling of high frequency reference clock cycles to system hardware modules. The clock generator controller 138 then counts down the total number of specified high frequency reference clock cycles, NUM_HF_SLEEP, until it stops receiving high frequency reference clock cycles. This occurs when the clock generator timer 140 senses the first rising edge of the low frequency sleep clock cycle (see FIG. 6b) and the clock generator timer 140 deactivates the high frequency reference oscillator 160 and the high frequency reference clock 102 via line 162.

The clock generator timer 140 then counts down the specified total number of low frequency clock cycles, NUM_LF_OSC_OFF. After the clock generator timer 140 counts down the specified total number of low frequency clock cycles, it reactivates the high frequency reference oscillator 160 and the high frequency reference clock 102 via line 162, for a warm-up period, consisting of NUM_LF_WU low frequency sleep clock cycles. Once the specified number NUM_LF_WU sleep clock cycles has occurred, and the clock generator timer senses the trailing rising edge of the last low frequency sleep clock cycle, NUM_LF_TOTth, wherein NUM_LF_TOT=NUM_LF_OSC_OFF+NUM_LF_WU, the clock generator timer 140 activates gate 154 to enable high frequency reference clock cycles to the clock generator controller 138. This causes the clock generator controller 138 to continue to count down the specified total number of high frequency reference clock cycles, NUM_HF_SLEEP (see FIG. 6c).

After the clock generator controller 138 counts down the specified total number of high frequency reference clock cycles, NUM_HF_SLEEP, the clock generator controller 138 activates gate 152, via the sysclk_enb signal, enabling high frequency reference clock cycles to system hardware modules. Also, the clock generator controller 138 deactivates gate 150 such that high frequency reference clock cycles are no longer gated to the clock generator timer 140. An advantage of utilizing the system for timing the sleep period is that by having the clock generator controller 138 count the specified total number of high frequency reference clock cycles, NUM_HF_SLEEP, the frequency error of the low frequency sleep clock 102 are compensated for, and at the end of the sleep period, the high frequency reference clock 104 of the mobile station will be restarted with a zero mean time error to provide high frequency reference clock cycles to system hardware modules and will properly time synchronize the receiver of the mobile station with the base station for the receipt of pages.

Although FIGS. 7 and 8 illustrate hardware implementations of the invention, it is recognized that software modules may be used in an alternative embodiment, instead of hardware, to perform the desired functions and to implement the above-described invention. If the functional components described above are implemented in software, these components may be stored on a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; and electrical, optical, acoustical or other forms of propagated signals (e.g., carrier waves, infrared signals, digital signals, etc.).

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention. With such possibilities in mind, the invention is defined with reference to the following claims.

What is claimed is:

1. A method for restarting a high frequency reference clock of a mobile station after a sleep period with a zero mean time error, wherein during most of the sleep period the high frequency, reference clock is deactivated and a low frequency low power sleep clock is utilized instead, the method comprising:

calibrating the sleep clock with respect to the reference clock during a specified calibration period including counting a first number of reference clock cycles from the beginning of the specified calibration period until the first rising edge of a first sleep clock cycle, waiting for a predetermined number of sleep clock cycles to occur, and counting a second number of reference clock cycles from the rising edge of a last sleep clock cycle until the end of the calibration period;

adding the first number of reference clock cycles to the second number of reference clock cycles to calculate an actual number of reference clock cycles;

calculating an expected number of reference clock cycles for the specific calibration period;

determining a calibration error between the reference clock and the sleep clock by subtracting the expected number of reference clock cycles from the actual number of reference clock cycles;

determining a wake-up time error based upon the calibration error; and utilizing the wake-up time error to compensate for the error of the sleep clock such that the reference clock restarts at the end of the sleep period with a zero mean time error.

2. The method of claim 1 wherein determining the calibration error between the reference clock and the sleep clock comprises:

counting an actual number of reference clock cycles for the specified calibration period;

determining an expected number of reference clock cycles for the specified calibration period; and subtracting the expected number of reference clock cycles from the actual number of reference clock cycles.

3. The method of claim 1 wherein the wake-up time error is determined by multiplying the calibration error by the ratio of the sleep period to the calibration period.

4. The method of claim 1 further comprising:

calculating a total number of reference clock cycles to be counted for the sleep period; and calculating a total number of sleep clock cycles to be counted for the sleep period.

5. The method of claim 4 wherein the calculation of the total number of reference clock cycles comprises:

determining a nominal number of reference clock cycles for the sleep period, the nominal number being the number of reference clock cycles needed to properly utilize the sleep clock to time the sleep period, if the sleep clock did not have an error associated with it; and adding the wake-up time error to the nominal number to compensate for the error of the sleep clock such that the reference clock restarts at the end of the sleep period with a zero mean time error.

6. The method of claim 5 wherein the method for restarting the reference clock at the end of the sleep period with a zero mean time error comprises:

counting reference clock cycles from the beginning of the sleep period until the first rising edge of a first sleep clock cycle;

deactivating the reference clock;

counting sleep clock cycles until the total number of sleep clock cycles has been counted;

reactivating the reference clock; and counting reference clock cycles until the total number of reference clock cycles has been counted which marks the end of the sleep period and the reference clock is restarted with a zero mean time error.

7. A system for calibrating a low frequency low power sleep clock with respect to a high frequency reference clock for a mobile station during a specified calibration period, the system comprising:

a high frequency reference clock generator generating reference clock cycles;

a low frequency sleep clock generator generating sleep clock cycles;

a high frequency reference clock counter counting an actual number of reference clock cycles that occur during the specified calibration period;

a logic and clock edge detector gating reference clock cycles to the high frequency reference clock counter and disabling reference clock cycles to the high frequency reference counter during a sleep period, wherein after the rising edge of a first sleep clock cycle the logic and clock edge detector disables reference clock cycles to the high frequency reference counter and counts a number of sleep clock cycles and after the trailing rising edge of a last sleep clock cycle the logic and clock edge detector gates reference clock cycles to the high frequency reference counter; and a calibration unit which calculates a calibration error for the sleep clock by subtracting an expected number of reference clock cycles for the calibration period from the actual number of reference clock cycles counted during the calibration period.

8. A system for restarting high frequency reference clock cycles to system hardware modules of a mobile station after a sleep period with a zero mean time error, wherein during most of the sleep period a high frequency reference clock generator is deactivated and a low frequency low power sleep clock generator is utilized instead, the system comprising:

a high frequency reference clock generator generating reference clock cycles;

a low frequency sleep clock generator generating sleep clock cycles;

a reference clock calculation unit calculating a specified number of reference clock cycles which compensates for an error generated by the use of the sleep clock generator;

a clock generator controller counting down a specified number of reference clock cycles; and a clock generator timer counting down a specified number of sleep clock cycles, the clock generator timer deactivating the high frequency reference clock generator during the period of the specified number of sleep clock cycles and reactivating the high frequency reference clock generator at the end of the specified number of sleep clock cycles, the clock generator controller then counting down the remaining specified number of reference clock cycles and restarting the reference clock cycles to system hardware modules with a zero mean time error.

9. The system of claim 8 wherein the reference clock calculation unit calculates the specified number of reference clock cycles by determining a nominal number of reference clock cycles for the sleep period, the nominal number being the number of reference clock cycles needed to properly utilize the sleep clock generator to time the sleep period if the sleep clock generator did not have an error associated with it, and by adding a wake-up time error to the nominal number to compensate for the error of the sleep clock generator.

10. The system of claim 9 wherein the wake-up time error is determined by multiplying a predetermined calibration error, calculated during a calibration period for the sleep clock generator, by the ratio of the sleep period to the calibration period.

11. A machine-readable medium having stored thereon instructions, which when executed by a set of processors, cause said set of processors to perform method steps for restarting a high frequency reference clock of a mobile station after a sleep period with a zero mean time error, wherein during most of the sleep period the high frequency reference clock is deactivated and a low frequency low power sleep clock is utilized instead, the method comprising:

calibrating the sleep clock with respect to the reference clock during a specified calibration period including counting a first number of reference clock cycles from the beginning of the specified calibration period until the first rising edge of a first sleep clock cycle, waiting for a predetermined number of sleep clock cycles to occur, and counting a second number of reference clock cycles from the rising edge of a last sleep clock cycle until the end of the calibration period;

adding the first number of reference clock cycles to the second number of reference clock cycles to calculate an actual number of reference clock cycles;

calculating an expected number of reference clock cycles for the specific calibration period;

determining a calibration error between the reference clock and the sleep clock by subtracting the expected number of reference clock cycles from the actual number of reference clock cycles;

determining a wake-up time error based upon the calibration error; and utilizing the wake-up time error to compensate for the error of the sleep clock such that the reference clock restarts at the end of the sleep period with a zero mean time error.

12. The machine-readable medium of claim 11 wherein determining the calibration error between the reference clock and the sleep clock comprises:

counting an actual number of reference clock cycles for the specified calibration period;

determining an expected number of reference clock cycles for the specified calibration period; and subtracting the expected number of reference clock cycles from the actual number of reference clock cycles.

13. The machine-readable medium of claim 11 wherein the wake-up time error is determined by multiplying the calibration error by the ratio of the sleep period to the calibration period.

14. The machine-readable medium of claim 11 further comprising:

calculating a total number of reference clock cycles to be counted for the sleep period; and calculating a total number of sleep clock cycles to be counted for the sleep period.

15. The machine-readable medium of claim 14 wherein the calculation of the total number of reference clock cycles comprises:

determining a nominal number of reference clock cycles for the sleep period, the nominal number being the number of reference clock cycles needed to properly utilize the sleep clock to time the sleep period, if the sleep clock did not have an error associated with it; and adding the wake-up time error to the nominal number to compensate for the error of the sleep clock such that the reference clock restarts at the end of the sleep period with a zero mean time error.

16. The machine-readable medium of claim 15 wherein the method for restarting the reference clock at the end of the sleep period with a zero mean time error comprises:

counting reference clock cycles from the beginning of the sleep period until the first rising edge of a first sleep clock cycle;

deactivating the reference clock;

counting sleep clock cycles until the total number of sleep clock cycles has been counted;

reactivating the reference clock; and counting reference clock cycles until the total number of reference clock cycles has been counted which marks the end of the sleep period and the reference clock is restarted with a zero mean time error.

* * * * *